United States Patent [19]

Blesser et al.

[11] Patent Number: 4,644,102
[45] Date of Patent: Feb. 17, 1987

[54] DIGITIZING TABLET SYSTEM

[75] Inventors: Barry A. Blesser, Raymond, N.H.; Thomas C. Prentice, Milford, Mass.

[73] Assignee: Pencept, Inc., Waltham, Mass.

[21] Appl. No.: 717,534

[22] Filed: Mar. 29, 1985

[51] Int. Cl.⁴ .............................................. G08C 21/00
[52] U.S. Cl. ........................................................ 178/19
[58] Field of Search ...................... 178/18, 19; 364/520

[56] References Cited

U.S. PATENT DOCUMENTS

| | | | |
|---|---|---|---|
| 3,399,401 | 8/1968 | Ellis et al. | 340/324 |
| 3,500,323 | 3/1970 | Funk et al. | 340/146.3 |
| 3,974,332 | 8/1976 | Abe et al. | 178/18 |
| 3,975,592 | 8/1976 | Carvey | 178/18 |
| 3,999,012 | 12/1976 | Dym | 178/18 |
| 4,009,338 | 2/1977 | Dym et al. | 178/18 |
| 4,088,842 | 5/1978 | Ikedo | 178/19 |
| 4,240,065 | 12/1980 | Howbrook | 340/146.3 |
| 4,255,617 | 3/1981 | Carau et al. | 178/19 |
| 4,375,081 | 2/1983 | Blesser | 364/724 |
| 4,577,057 | 3/1986 | Blesser | 178/18 |
| 4,582,955 | 4/1986 | Blesser | 178/19 |

FOREIGN PATENT DOCUMENTS 2080539 2/1982 United Kingdom .
2117154 10/1983 United Kingdom .

OTHER PUBLICATIONS

Patent Abstracts of Japan, vol. 8, No. 275 (P-321) [1712], Dec. 15, 1984.
Patent Abstracts of Japan, vol. 8, No. 271 (P-320) [1708], Dec. 12, 1984.
Patent Abstracts of Japan, vol. 7, No. 241 (P-232) [1386], Oct. 26, 1983.
IBM Technical Disclosure Bulletin, vol. 22, No. 3, (pp. 1245–1251), Aug. 1979.
SID International Symposium Digest of Technical Papers, (pp. 32–35), May, 1985.

Primary Examiner—Stafford D. Schreyer
Attorney, Agent, or Firm—Robert M. Asher

[57] ABSTRACT

A digitizing tablet is disclosed in which two multiplexors are connected to alternate conductive loop elements in each plane of elements. The two multiplexors are connected to a differential amplifier. The signals from the differential amplifier are demodulated. The demodulated signal is provided to an integrator. A microprocessor controlled reset switch is connected across the integrator to reset the integrator after the completion of each measurement. Grounded copper strips are used in the space formed within and between the conductive loop elements of the digitizing tablet to shield the loop elements from capacitive interference.

13 Claims, 3 Drawing Figures

DIGITIZING TABLET SYSTEM

BACKGROUND OF THE INVENTION

The present invention relates generally to digitizing tablet systems and more particularly to digitizing tablet systems which include a conductive grid structure and a stylus structure which is inductively coupled to the conductive grid structure.

Digitizing tablet systems are well known in the art and are used in a variety of applications. These systems generally contain a tablet including a housing having a two-dimensional work support surface and a grid of conductive elements. The stylus which interacts with the grid structure generally contains one or more electric coils. The coil(s) in the stylus are inductively coupled to the grid in the tablet by energizing either the coil or the grid with an AC voltage signal. The voltage signal induced in the other component is then measured. The measured signals are then used to determine the position of the stylus relative to the grid.

The grid for a tablet system may be configured by having a number of parallel wire loops forming horizontal loops across the grid and another set of parallel wire loops perpendicular to the horizontal loops forming vertical columns in the grid. Each loop is a discrete sensor for sensing the intensity of the current or voltage induced by the coil or coils of the stylus. To determine the location of the stylus when it is between loops, an interpolation must be performed. The basic magnetic equations which relate the field intensity of the induced current to the location of the stylus coils will generally be in the form of a parabola in the region of interest. By comparing the intensity of a current sensed in adjacent loops, one can determine the location of the coils.

The signals received from the loops are demodulated and filtered. Demodulation produces a DC signal proportional to the original sine wave plus AC components which are generally at multiples of the sine wave frequency. To get precision measurements, the resulting signal is generally low-pass filtered to remove the higher-frequency components and also to remove extraneous noise. A typical low-pass filter is not optimum for several reasons. For a given response time, the bandwidth for noise must be larger than it needs to be since the normal low pass filter must wait for old information to decay before it can work on the next set of information.

The conductive grid of a digitizing tablet is subject to capacitive interference. For example, a radio or even a hand would carry an electric field which would act as a capacitor on the lines of the grid. Thus, it would be desirable to provide a mechanism for shielding the grid from interference.

SUMMARY OF THE INVENTION

The invention is directed to a digitizing tablet which is used in conjunction with a position indicating structure having a field generating element such as a coil. The tablet is contained within a housing having a two-dimensional work surface. Parallel spaced conductive elements form a plane parallel to the work surface of the housing. A first multiplexor connects alternate ones of said conductive elements. A second multiplexor is connected to the remainder of the parallel conductive elements. A differential amplifier receives inputs from each of said multiplexors and provides output signals to a processor. The processor produces data signals which correspond to the position of the position indicating structure relative to the two-dimensional work surface.

In accordance with further features of the present invention, a matched filter is provided to facilitate the processing of the signals received from the differential amplifier. The matched filter removes noise and the AC component received from the output of a demodulator connected between the filter and the differential amplifier. A reset switch is used after each measurement to remove transient effects and accelerate the signal processing. In addition an electrical shield made of grounded copper strips is placed over the conductive loops of the digitizing tablet.

The two multiplexors and differential amplifier provide an immediate comparison between the signals in adjacent conductive elements. The resulting signal has been advantageously stripped of common mode noise and unwanted common mode signal, thus increasing the signal-to-noise ratio. As such, the resulting signal may be amplified to a far greater extent than would be the case if the entire signal received through each loop were used. Thus, greater precision can be accomplished in the position determination.

A further advantage of the present invention results from the use of a matched filter. The matched filter is much quicker in operation than a simple low-pass filter since the reset switch quickly restores it to its original state after completing each measurement.

In accordance with a still further advantage of the present invention, the grounded copper strips serve as an electrical shield without the ill effects of reversed fields that would be generated by a conventional grounded copper sheet.

Other objects and advantages of the invention will become apparent during the following description of the presently preferred embodiment of the invention taken in conjunction with the drawings.

DETAILED DESCRIPTION OF THE PREFERRED EMBODIMENT

Figure 1:
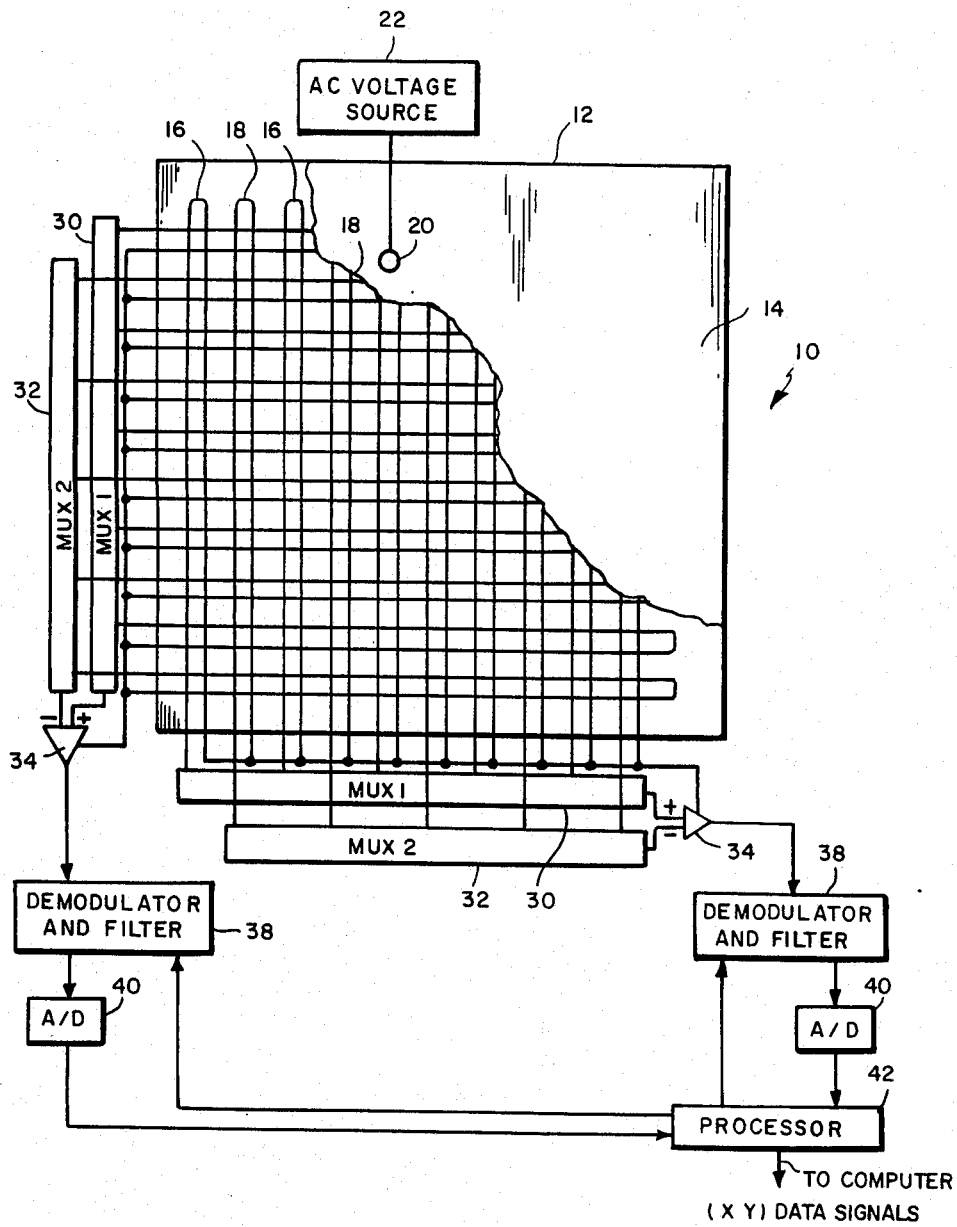
FIG. 1 is a schematic view of the digitizing tablet of the present invention.

Turning now to the drawings, FIG. 1 is a simplified schematic representation of a digitizing tablet 10. The tablet includes a housing 12. The top of the housing 12 is a two-dimensional work surface 14. Beneath the work surface is a set of parallel spaced conductive elements 16 and 18 disposed in a plane parallel to the work surface 14. Elements 16 alternate side by side with elements 18. In the presently preferred embodiment, the conductive elements 16 and 18 are preferably conductive loops equal in size. Two planes of conductive elements are provided. Each plane of conductive elements defines a different coordinate axis. In the preferred embodiment, the axes are defined perpendicular to one another to easily define a two-dimensional space. A position indicating structure 20 is connected with an AC voltage source 22. The position indicating structure 20 contains a field generating element such as a coil which is detectable by the current which it induces in the conductive element of the digitizing tablet. The presently preferred position indicating structure is a stylus having two magnetizable coils each carrying an AC current which is 90° out of phase with the current in the other coil. The presently preferred position indicating structure is described in applicants' copending application entitled "Position Indicating Apparatus for the Use in a Digitizing Tablet System", bearing U.S. Ser. No. 672,310, filed Nov. 16, 1984 and sharing the same assignee as the present invention, the disclosure of which is hereby incorporated by reference herein.

Each plane of conductive elements has two sets of conductive elements which alternate with one another. A first set of conductive elements 16 is connected to a first multiplexor 30. A second set of conductive elements 18 alternate with the first set of conductive elements in the respective plane and are connected to a second multiplexor 32. The output of both multiplexors 30 and 32 are fed into a differential amplifier 34. The differential amplifier 34 produces a signal which indicates the difference in the induced currents of adjacent conductive loops. Common mode noise which is induced in the loops is eliminated from the resultant signal because of the subtraction process which occurs within the differential amplifier 34. The resulting signal offers the advantage of being smaller in magnitude than the original signals directly derived from the induced current in the conductive loop elements. Since the parabolic interpolation algorithm uses difference signals as input, these signals can be measured directly, thereby eliminating the time discrepancy between two signals measured one at a time, as well as eliminating common mode signal, thereby increasing the signal-to-noise ratio. Thus, a greater amount of amplification can be applied to the resulting signal thereby enhancing the precision with which the position of the position indicating structure can be determined.

The difference signal from the differential amplifier 34 is fed into the demodulator and filter 38. The demodulator and filter 38 provides its resulting signal to analog to digital converter 40. The analog to digital converter 40 provides digital signals to a processor 42. The processor 42 converts the digital signals into data signals corresponding to the position of the position indicating structure 20 over the work surface 14. The processor 42 contains software well known in the art for converting the digital signals into data signals corresponding to the position in the X and Y axes. The X and Y data signals may be fed into a computer and easily understood.

It should be recognized that more than two multiplexors may be provided for each plane of conductive elements. For example, if three multiplexors were used every third conductive element would be provided as an input to the same multiplexor. The use of two multiplexors is the presently preferred embodiment.

Another advantage to the present invention is that the input to the amplifier 34 is balanced and therefore less sensitive to pickup and nonuniform signal effects. Only the difference is being amplified and therefore we can use a much larger gain. This greatly improves the overall position determination accuracy of the digitizing tablet by providing a higher resolution.

One problem with this embodiment is that the sign of the result will be positive for some pairs and negative for others. Generally, this is not a problem, though, since the negative results can be inverted in other hardware such as the processor 42.

An alternative embodiment of the digitizing tablet of the present invention involves tying one conductive element from the first multiplexor 30 to ground and one conductive element from the second multiplexor 32 to ground. Although the use of two multiplexors reduces the significant data to only comparative signals between loops, absolute data may be desired. This alternative embodiment makes such measurements possible. In another embodiment, the duplication of demodulator and filter 38 and analog to digital convertor 40 is removed by time sharing the X and Y grid systems.

Figure 2:
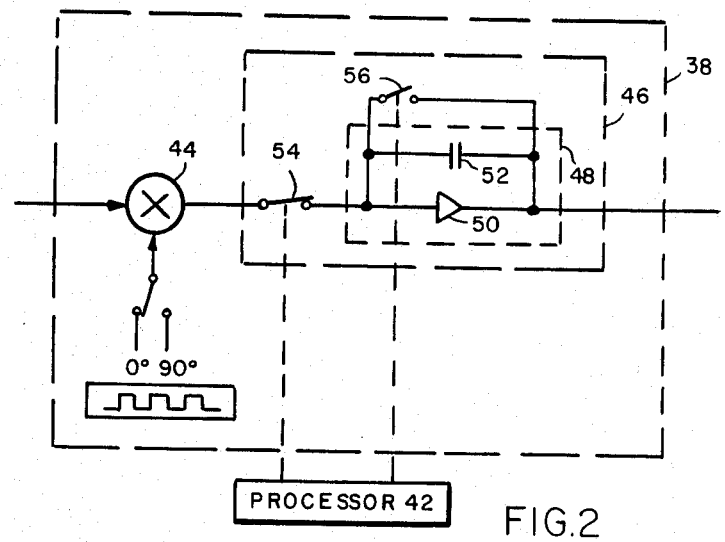
FIG. 2 is a schematic view of the demodulator and filter of the digitizing tablet of FIG. 1.

Referring now to FIG. 2, the demodulator and filter 38 of the digitizing tablet of the present invention is described in greater detail. The amplified difference signal received from amplifier 36 is fed into multiplier 44. The multiplier 44 modulates the received signal with a square wave. For a one coil position indicating structure, there would only be a need for one square wave. However, if the position indicating structure has two coils which are run at different phases, the square wave must be changed to select the coil whose information will be processed. In the presently preferred embodiment, the position indicating structure has two coils which carry currents 90° out of phase thus the multiplier 44 has access to two square waves which match the phase of the currents in the coils and are likewise 90° out of phase. The processor 42 selectively switches between the two square waves to supply the proper one to the multiplier 44. In a one-coil system, the multiplier 44 can be replaced by a full wave rectifier.

The resulting signal from the demodulation performed by the multiplier 44 is a DC proportional to the original sine wave plus an AC component which is predominantly at twice the sine wave frequency. To get precision measurements, the result is filtered to remove the double frequency component and extraneous noise. A typical low-pass filter is not optimum because it takes an unnecessary amount of time to wait for the old information in the filter to decay. In the present invention, a matched filter 46 is provided which is reset to zero at the beginning of each measurement. The matched filter 46 includes an integrator 48. The integrator 48 includes an amplifier 50 and a capacitor 52. The capacitor 52 is connected as a feedback capacitor from the output of the amplifier 50 to the amplifier's input. The output of the multiplier 44 is fed through a switch 54 to the integrator 48. Switch 54 is closed by processor 42 at the beginning of a measurement.

A reset switch 56 is connected in parallel with capacitor 52. Reset switch 56 is opened at the beginning of a measurement by the processor 42. The signal from the multiplier 44 passes through closed switch 54 and is allowed to integrate in the integrator 48 for a fixed number of sine wave cycles. Upon completion of the integration, the processor 42 opens switch 54 and the results of the integration is provided to the analog to digital converter 40. The processor 42 closes switch 56 to discharge capacitor 52. The matched filter 46 is then ready for the next measurement. This matched filter allows for control of the gain and the bandwidth by giving the processor 42 control over switch 54 and reset switch 56. For each doubling of the integration time, the bandwidth is reduced by a factor of 2 and the noise injection is reduced by a factor of square root of 2 relative to the signal. Correspondingly, the signal amplitude can be made very large. This allows for microprocessor control of the dynamic range of the system. The performance of later stages such as the analog to digital converter can be optimized by timing adjustments made by the processor 42.

By making the integration time be an integer number of cycles, the amount of double frequency component is removed from playing a role in the final accuracy of this system. Also, the built-in reset switch 56 allows for all extraneous transients to be ignored before the active portion of the measurement is started. Normal low-pass filters must wait for the old information to decay.

Figure 3:
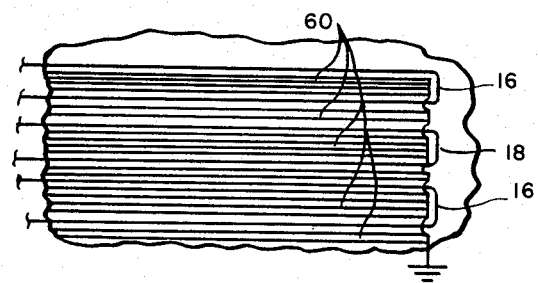
FIG. 3 is a diagrammatic view of the electric shielding used on the digitizing tablet of FIG. 1.

Referring now to FIG. 3, the electrical shield of the present invention is shown. Since the conductive loops of the digitizing tablet of the present invention are subject to capacitive interference from electrical fields caused by a person's hand or a radio or many other common sources of interference, it can sometimes be desirable to provide an electrical shield for the conductive loops. The normal method of removing interference would be to apply a grounded copper sheet over the area which needs to be shielded. However, reverse electric current would be induced in the shield causing reverse magnetic fields and would thus interfere with the magnetic field of the position indicating structure used for position detection. In accordance with the present invention, a series of copper strips 60 are located in the space formed within and between the conductive loops to shield against interference. The strips 60 of copper shielding should be made as thin as is possible in accordance with manufacturing processes for making the printed circuit boards containing the conductive loops. The copper strips 60 do not provide a loop in which an electric current can be induced. The copper strips 60 should be grounded at one end and are open at the other end. The final circuit board for the presently preferred embodiment has a copper strip shield on both sides of the tablet circuit board. The strips on either side are perpendicular to one another and lie directly over the plane of conductive loops closest to the respective shield. The horizontal copper strips lie over the horizontal conductive loops and the vertical copper strips are on the other side of the circuit board overlying the vertical conductive loops.

Embodiments of the present invention are intended to be merely exemplary and those skilled in the art shall be able to make numerous variations and modifications to them without departing from the spirit of the present invention. All such variations and modifications are intended to be within the scope of the present invention as defined in the appended claims.

We claim:

1. A digitizing tablet for use with a position indicating structure having a field generating element, said tablet comprising:
   a housing having a two-dimensional work surface;
   a first plurality of spaced parallel conductive elements disposed in a plane parallel to said work surface;
   a second plurality of conductive elements disposed in the plane of said first plurality of conductive elements and spaced in parallel and alternately with said first plurality of conductive elements;
   a first multiplexor connected to each of said first plurality of spaced parallel conductive elements;
   a second multiplexor connected to each of said second plurality of conductive elements;
   a differential amplifier having one input connected to the output of said first multiplexor and a second input connected to the output of said second multiplexor; and
   processing means connected to the output of said differential amplifier for processing signals received from said differential amplifier to produce data signals corresponding to the position of the position indicating structure relative to the two-dimensional work surface.

2. The digitizing tablet of claim 1 wherein said processing means includes an integrator.

3. The digitizing tablet of claim 2 wherein said processing means further includes a microprocessor controlled switch for resetting said integrator circuit.

4. The digitizing tablet of claim 1 wherein said conductive elements are conductive loops equal in size.

5. The digitizing tablet of claim 4 further comprising an electrical shield including a plurality of grounded copper strips located in the space formed within and between said conductive loop elements.

6. A digitizing tablet for use with a position indicating structure having a field generating element, said tablet comprising:
   a grid of conductive elements in which a signal is induced by said field generating element;
   multiplexor means for providing induced signals from said conductive elements to an output one at a time;
   amplifier means for amplifying the signals received from said multiplexor means;
   means for demodulating the signals provided by said amplifier means
   filter means for removing the AC component from the demodulated signals;
   means for converting the signals from said filter means into digital signals;
   processor means for converting said digital signals into data signals corresponding to the position of the position indicating structure relative to the two-dimensional work surface; and
   a reset switch controlled by said processor means for resetting said filter means.

7. The digitizing tablet of claim 6 wherein said filter means is an integrator.

8. The digitizing tablet of claim 7 wherein said integrator includes an amplifier and a feedback capacitor.

9. The digitizing tablet of claim 8 wherein said reset switch is connected in parallel with said feedback capacitor.

10. A digitizing tablet for use with a position indicating structure having a field generating element said tablet comprising:
    a housing having a two-dimensional work surface;
    a grid structure in the housing, said grid structure including a first plurality of spaced parallel conductive loop elements equal in size disposed in a plane parallel to said work surface and defining a first coordinate axis and a second plurality of spaced parallel conductive loop elements equal in size disposed in a plane parallel to said work surface and defining a second coordinate axis;
    a plurality of grounded copper strips located in the space formed within said conductive loops to shield said loops from capacitive interference; and
    processing means for processing signals induced in said conductive loops to produce data signals corresponding to the position of the position indicating structure relative to the grid structure.

11. The digitizing tablet of claim 10 further comprising a second plurality of grounded copper strips located in the space formed between said conductive loops.

12. The digitizing tablet of claim 10 further comprising two multiplexors connected to alternate conductive loop elements in said first plurality of spaced parallel elements and two multiplexors connected to alternate conductive loop elements in said second plurality of loop elements.

13. The digitizing tablet of claim 12 further comprising a first differential amplifier connected to said two multiplexors which are connnected to said first plurality of conductive loop elements and a second differential amplifier connected to said two multiplexors which are connected to said second plurality of conductive loop elements.

* * * * *